Aug. 31, 1965 R. A. MASON 3,203,607

TAPE STORAGE APPARATUS

Filed Oct. 30, 1962

Inventor
RALPH A. MASON
By Percy P. Lantzy
Attorney

United States Patent Office 3,203,607
Patented Aug. 31, 1965

3,203,607
TAPE STORAGE APPARATUS

Ralph Allen Mason, Croydon, Surrey, England, assignor to Creed & Company Limited, Surrey, England, a British company Filed Oct. 30, 1962, Ser. No. 234,161
Claims priority, application Great Britain, Nov. 15, 1961, 40,857/61
4 Claims. (Cl. 226—119)

This invention relates to improvements in tape storage apparatus.

Tape storage apparatus is known in which magnetic or perforated tape is stored in a bin having two major walls spaced apart by a distance a little in excess of the tape width. As tape is fed into this type of bin it assumes a serpentine form, and in that form successive layers of tape build up to occupy the storage space formed between the two major walls. A disadvantage of employing this form of storage apparatus arises from the fact that a mass of tape is caused to gather at the entrance to the bin, and prevents further feeding of the tape thereinto. In same instance only 50% of the storage space within a bin is effectively utilised; and various means have been provided to deflect the tape, as it enters the bin, so that it is disposed more uniformly throughout the storage space available. It is the object of the present invention to provide tape storage apparatus incorporating means for making more economic use of the storage space available in such apparatus.

According to the present invention therefore, there is provided tape storage apparatus including two major walls spaced apart by a distance in excess of the width of the tape, a plurality of minor walls which with the said major walls form a box-like structure for the storage of the tape therein, and at least one movable member within said box-like structure arranged to engage and move the tape during feeding thereof into the said box-like structure.

Figure 1:
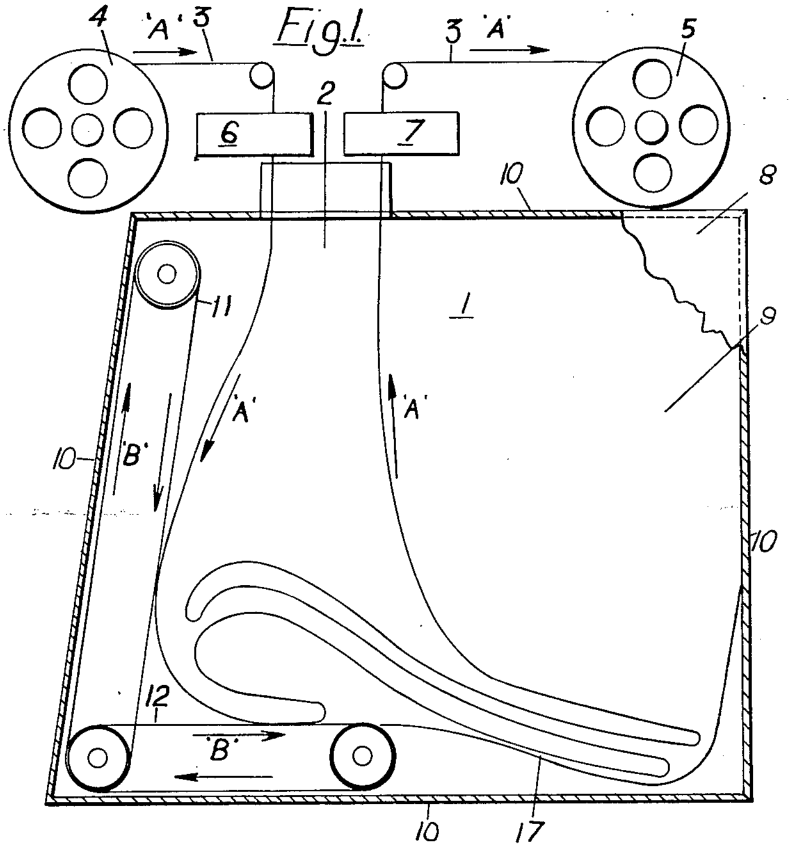
Figure 2:
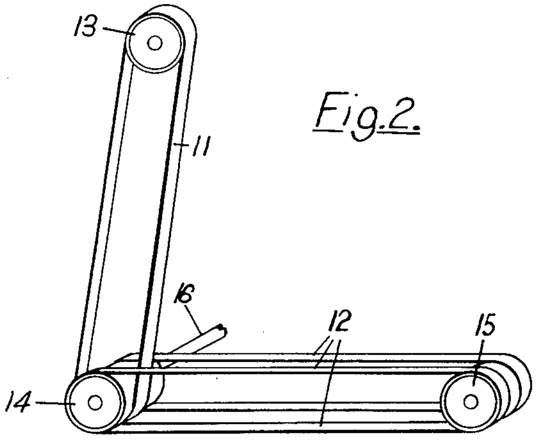

The invention will be better understood from the following description read with reference to the accompanying drawings in which:

FIG. 1 shows a part-sectioned side view of one embodiment of the apparatus according to the present invention, and FIG. 2 shows an arrangement of movable walls associated with a container for tape, such movable walls constituting part of the apparatus of FIG. 1.

Referring now in the first instance to FIG. 1, the tape storage apparatus constituting this particular embodiment of the invention comprises a container 1 having an aperture 2 which serves both as an exit and entrance to the container for tape 3. The tape 3 is accommodated on reels 4 and 5 for movement therebetween in the directions indicated by the arrows "A" by way of, for example, a tape perforator 6 and a tape reader 7. The container 1 is a box-like structure and comprises two major walls 8 and 9 spaced apart by a number of minor walls 10, by an amount slightly in excess of the width of the tape 3.

Movable members within the container are constituted by a belt 11 mounted on pulleys 13 and 14, and belts such as 12 mounted side by side on pulleys 14 and 15. A pictorial view of the belts and pulleys is shown in FIG. 2; pulley 14 acts as a common drive, from shaft 16 for all the belts, belts 12 being arranged either side of belt 11. Referring now again to FIG. 1 and FIG. 2, the belts are driven by pulley 14 to move in the directions indicated by the arrows "B," belts 12 being arranged so that the upper surfaces thereof are substantially coplanar with one end of a deflector plate 17 mounted between the major walls 8 and 9 of the container 1.

In operation of the apparatus, the belts 11 and 12 are caused to move in the directions indicated by the arrows "*b*." The tape 3 is withdrawn from reel 4, by means of the tape perforator 6, and fed into the container 1, while reel 5 remains stationary. During feeding of the tape 3 into the container 1, there is a natural tendency for the tape to "bow," and thus it is caused to engage the moving belts 11 and 12. Loops are then formed in the tape (as shown in FIG. 1) one under another as the tape passes along the belt and onto the deflector plate 17. With the continued formation of loops, the first and successive ones so formed are moved upward in the container 1 until the tape storage space therein is substantially fully occupied. Withdrawal of the tape 3 from the container 1 onto reel 5, via the tape reader 7, is facilitated due to the more uniform disposition of the loops of tape within the container one on top of the other with the first loop formed adjacent to the aperture.

What I claim is:

1. Tape-storage apparatus comprising: two substantially parallel surfaces spaced apart by a distance which is slightly greater than the width of said tape; confining means cooperating with said substantially parallel surfaces to form a tape-storage compartment, said confining means comprising a plurality of minor walls substantially normal to said substantially parallel surfaces and comprising further first and second endless belts; means for movably mounting said first belt so that one surface of said belt constitutes a movable confining surface within said compartment and substantially parallel to one of the minor walls thereof; means for mounting said second belt so that a surface of said second belt forms a portion of a movable confining surface within said compartment and substantially parallel to a second minor wall thereof; and means for moving said belts to guide said tape as it is fed into said apparatus to follow a trajectory which is initially substantially parallel to one of said minor walls and which then turns and assumes a direction substantially parallel to said second one of said minor walls.

2. Tape-storage apparatus in accordance with claim 1 wherein said confining means further includes guide means which cooperates with said second belt to guide increments of said tape as they enter said tape-storage apparatus to form loops which are positioned under portions of said tape stored in said tape-storage apparatus.

3. Tape-storage apparatus is accordance with claim 1 wherein said mounting means comprises rollers mounted on axes which are substantially perpendicular to said substantially parallel surfaces, and wherein said moving means comprise means for rotating at least one of said rollers.

4. Tape-storage apparatus in accordance with claim 3, wherein one of said rollers is common to both said first and second endless belts and wherein said moving means comprises means for rotating said common roller.

References Cited by the Examiner

UNITED STATES PATENTS

| | | | |
|---|---|---|---|
| 1,087,801 | 2/14 | McCoy | 226—118 X |
| 1,595,238 | 8/26 | Minton | 226—119 X |
| 2,979,244 | 4/61 | Pouliart et al. | 226—118 |
| 3,021,989 | 2/62 | Sellers | 226—118 |
| 3,048,315 | 8/62 | Pankratz et al. | 226—118 |
| 3,072,311 | 1/63 | Cohen | 226—118 X |

M. HENSON WOOD, Jr., *Primary Examiner.*

ANDRES H. NIELSEN, SAMUEL F. COLEMAN, *Examiners.*